United States Patent [19]
Soglia et al.

[11] 3,779,618
[45] Dec. 18, 1973

[54] SELF-CENTERING MAGNETIC SUSPENSION

[75] Inventors: Luciano Soglia; Aldo Catitti; Ciampino Di Marino; Giancarlo Sacerdoti, all of Rome, Italy

[73] Assignee: Comitato Nazionale per l'Engergia Nucleare, Rome, Italy

[22] Filed: Feb. 24, 1972

[21] Appl. No.: 228,810

[30] Foreign Application Priority Data
Feb. 26, 1971  Italy .............................. 48671 A/71

[52] U.S. Cl. ................................. 308/10, 335/229
[51] Int. Cl. ............................................ F16c 39/00
[58] Field of Search .......................... 335/216, 229; 308/10

[56] References Cited
UNITED STATES PATENTS
2,856,239  10/1958  Dacus .................................. 308/10
3,476,449  11/1969  Chaboseau et al. .................. 308/10
3,629,753  12/1971  Kawabe et al. ................... 308/10 X Primary Examiner—George Harris
Attorney—Richards and Geier

[57] ABSTRACT

A device is provided for magnetically suspending a body which rotates about a vertical axis for centering said body radially with respect to said axis and for maintaining it at a constant height which device comprises a magnet which provides the main suspension force, a round armature fastened to the suspended body under said magnet which armature is provided with a peripheral tapered ridge for producing a radial return force when this armature moves radially with respect to a tapered circular pole piece of said magnet and with a series of disks each interposed between a pair of coils for producing the vertical balancing force as required for keeping the rotating load at a predetermined level.

7 Claims, 4 Drawing Figures

SELF-CENTERING MAGNETIC SUSPENSION

The object of this invention is an apparatus for magnetically suspending and self-centering a body which rotates about a vertical axis.

The use is already known of permanent magnets for suspending a rotating body although a stable vertical position of the body is not ensured by the devices so far disclosed to this purpose.

The use also of electrodynamic fields is known as a means for suspending rotating bodies which fields are produced by alternate current coils which act on metal masses attached to the suspended object. Usually the suspension devices so far produced are based either on one or the other of the above principles. However, as known, the permanent magnet suspension, although offering the advantage of a compact structure, has the drawback that the suspended body is not in a state of stable vertical equilibrium, in fact a stable equilibrium is reached in that case only when the body weight and the magnet force acting upon the body are balanced, the state of balance being attained for one only of the reciprocal positions of the two system components, that is the body and the magnet. The system then is considered to be instable.

On the other side the electrodynamic suspension, while permitting a continuous adjustment of the suspending force, suffers from the drawback of requiring an amount power which is quite considerable when compared to the suspended body weight and of being exceedingly large. It also does not display any effective radial centering action.

It is therefore an object of this invention to provide a device wherein the advantages are combined and the drawbacks are attenuated of the two methods and which is adapted for supplying a self-centering action on the suspended body.

According to this invention the electrodynamic force exerted by stacked coils on electroconductive metal masses fastened to a suspended body is conbined with the force exerted by a permanent magnet on a ferromagnetic armature fastened to the same body; said coils being fed with alternate current.

The magnitudes of the above forces are determined in such a way that the permanent magnet sustains the greater part of the body weight while the coils are given the task of maintaining the body at its equilibrium position and of supplying that part of the suspension force which is not provided by the permanent magnet. In other words, the force supplied by the coils automatically concurs with or opposes to the force supplied by the magnet depending on whether a concurrent or opposed force is required by the system for reaching a predetermined equilibrium position. A particular configuration of the magnet armature and pole pieces permits the centering of the suspended load and of the armature with respect to the magnet.

It is to be noted that there is no mechanical contact between the suspended load and the generating means of the suspension forces when the equilibrium position is attained, a predetermined space being left between them which will be referred to as "air gap" although it can also be occupied by a fluid other than air.

A first advantage of this invention is that the operating cost of the suspension is reduced with respect to a suspension operated by coils only, and this because, as already mentioned, the suspension force is mainly supplied by the magnet while the coils provide that force only which is required for compensating the unbalance between the magnet force and the body weight in order to maintain the latter at its equilibrium position.

A further advantage of the invention is that the suspended body is automatically centered by virtue of the geometrical configuration of the mechanical components of the magnetic circuit including the permanent magnet and particularly of the confronting surfaces of the magnet and of its armature.

Another advantage of the suspension device of this invention is that a body can be suspended thereby in such a way that the body can be rotated about the suspension axis without any mechanical contact between the stationary and the rotating members and therefore without any mechanical friction between them.

A further advantage of this device consists on its simple structure whereby it is definitely distinguished among the similar suspension so far disclosed.

Other advantages will become apparent from the following description and drawings.

Figure 1:
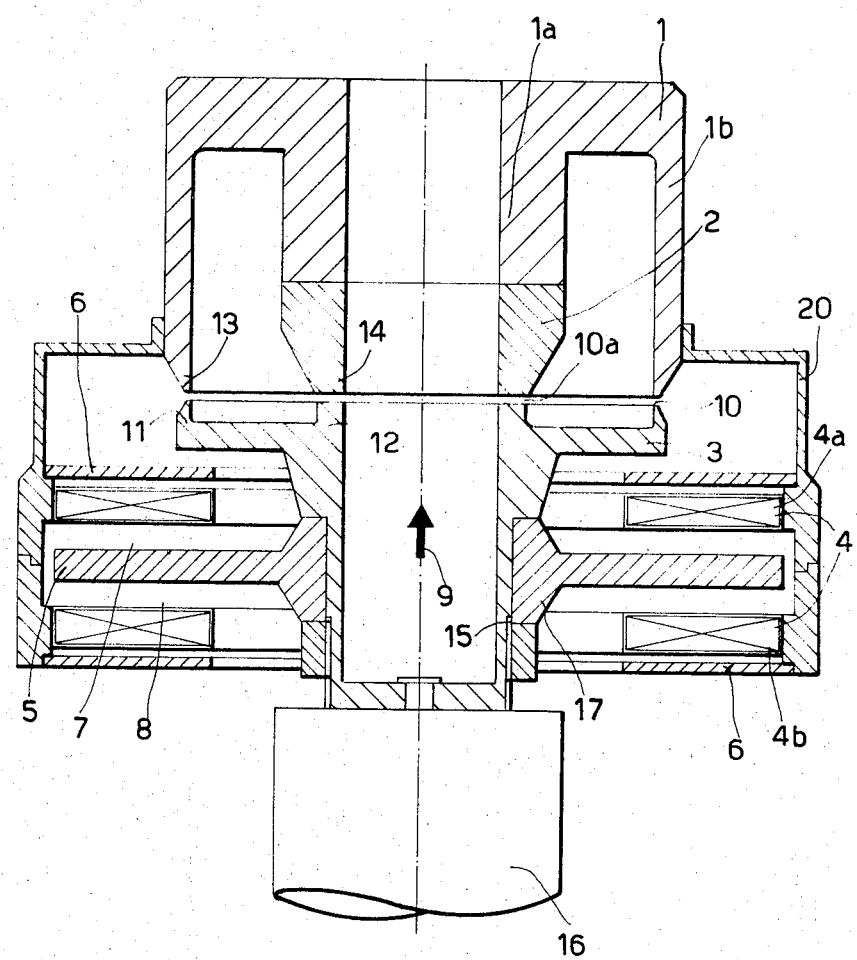
FIG. 1 shows an axial section of the device of this invention.

With reference to FIG. 1 the device of this invention comprises the following essential components:

a permanent magnet 2 of circular form either annular or solid with vertical axis and flat horizontal bases of which the upper one is larger than the lower;

a magnet support 1 made of ferromagnetic material with cylindrical form and horizontal upper and lower bases the lower base having generally the same surface of the upper base of magnet 2 and being securely bonded thereto. The upper portion of said support extends radially that is horizontally and then downwardly to reach with its terminal tapered edge the level of the lower face of said magnet. In this way a toroidal space is defined between said descending wall or skirt 1b and the inner cylinder consisting of the magnet and the overlying support portion;

an armature 3 by which the magnetic circuit generated by magnet 2 is closed which armature is disk-shaped, coaxial with said support in operation and provided with circular projections 11, 12 on its face confronting the bottom horizontal surfaces 13, 14 of magnet 2 and skirt 1b with an air gap between them; the reciprocally confronting faces having substantially the same surface;

a cylindrical hub 15 extending downwards from said armature 3, the useful load 16 being suspended from the bottom end of said hub;

one or more metal disks keyed on said hub 15;

two or more stacked electric coils 4 vertically spaced at a distance from one another large enough for receiving said metal disk 5 therebetween which coils are fastened to support 1 through a casing 20 of non magnetic material;

two annular shields 6 fastened to coils 4, which shields extend horizontally to cover those surfaces of coils 4 which are not facing body 5.

Magnet 2 and support 1 with the related portions 1a and 1b along with coils 4 are all mechanically connected to one the others and to an external stationary support not shown.

The major portion of the force for suspending the load attached to armature 3 including the useful load 16 is supplied by the magnetic flux through the pairs of pole pieces 12,14 and 11, 13 and through air gap 10 therebetween.

Figure 4:
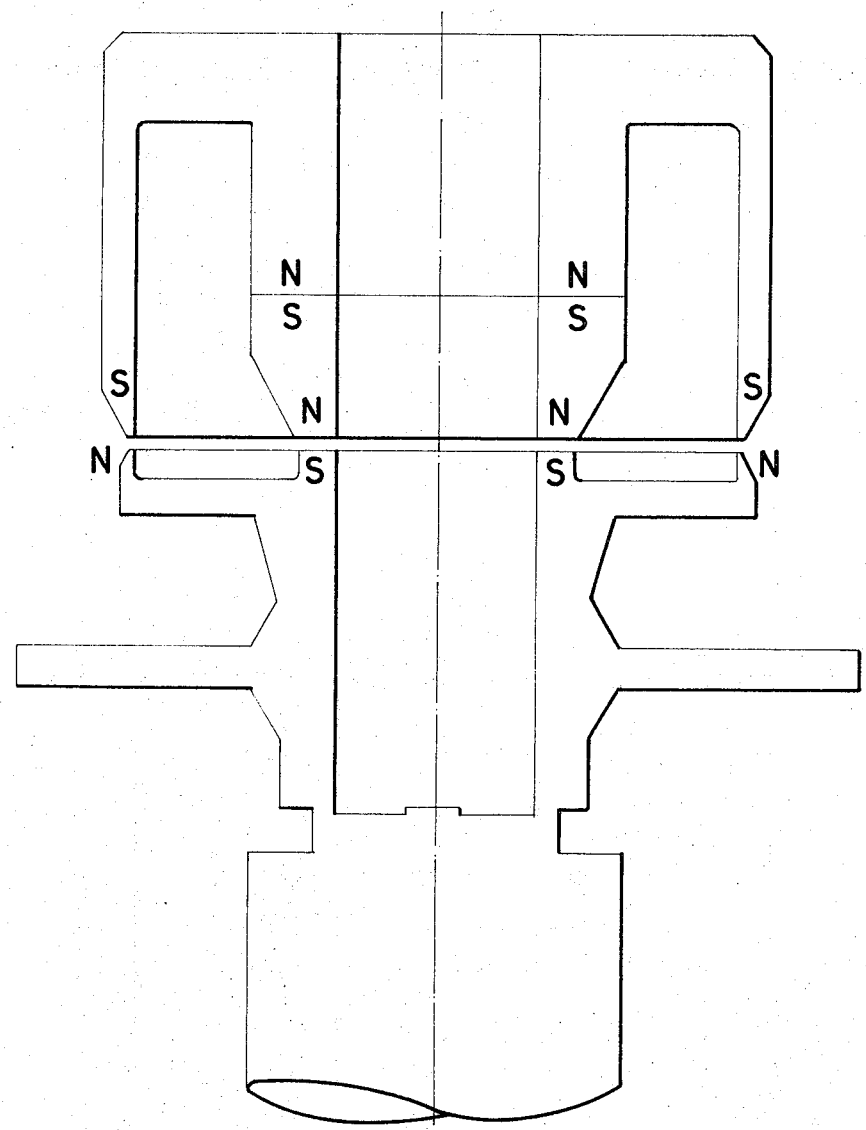
FIG. 4 is the same section of FIG. 1 wherein the magnet polarities are indicated.

Because the reciprocally facing surfaces of these pole pieces 11 and 13 are very narrow, a centering force is provided by them. In fact any radial displacement of armature 3 is counteracted by the magnetic force which tends to keep said piece poles in alignment. In fact as shown in FIG. 4, the magnetic circuit generated by magnet 2 and extending along the outer skirt of support 1 and along air gap 10a and armature 3, is strongly counter acted in the region of air gap 10 due to the small extension of the reciprocally facing surfaces across the gap and as a consequence a strong return action is produced when said surfaces are radially displaced from alignment.

Coils 4 have an annular form and a current is circulated through them which generates a magnetic field substantially perpendicular to the disklike body 5. The radial section of disk 5 may be rectangular and thickened towards the axis in order to form a stronger root section 17 to withstand the centrifugal force when the suspended load is rotated at high speed.

The surfaces of disk 5 and of shields 6 facing coils 4 are preferably parallel to each other.

Disk 5 and shields 6 are made of a good electroductive material, for instance aluminium, copper etc. Support 1 along with its portions 1a and 1b and armature 3 are made of ferromagnetic material; hub 15 may be of any material with mechanical properties as required for meeting the expected operating stresses.

Figure 2:
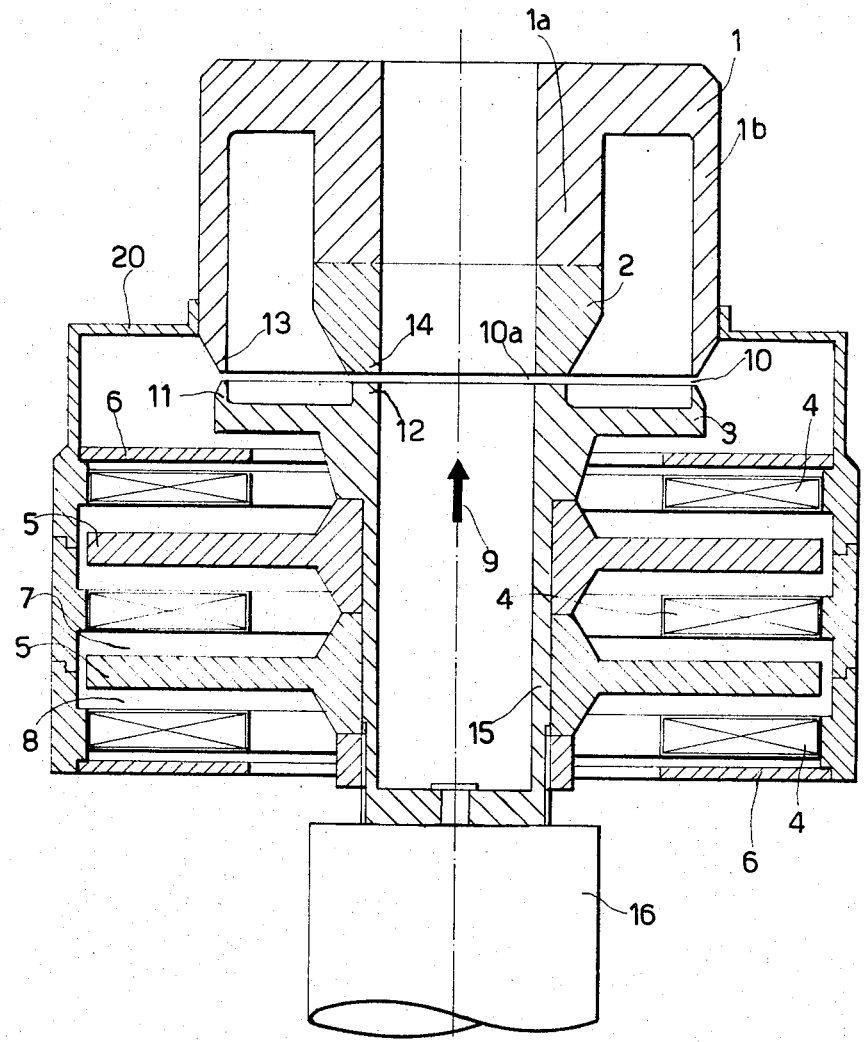
FIG. 2 is an axial section of a variant to the ambodiment of FIG. 1.

According to a variant of the embodiment illustrated in FIG. 1, two disks 5, as shown in FIG. 2, are mounted on the armature extension or hub 15. The two disks are interposed between three coils 4 with reciprocally facing horizontal surfaces. Obviously the number of disks 5 and of coils 4 may be larger than three and four respectively when a larger balancing force is required by disks 5 on coils 4.

Coils 4 are connected in series and are excited by means of alternate current with a frequency in the range from 100 to 5000 Herz.

The thickness of disks 5 and shields 6 will be dimensioned so as to avoid that said disks and shields be traversed by the magnetic lines generated by coils 4. In fact said lines should penetrate a portion only of the total thickness of said disks and shields so that the eddy currents generated in said elements be such as to produce repulsive fields that is such fields that are a mirror image of the fields produced by the current flowing through the coils.

The repulsive electrodynamic forces exerted by coils 4 on disks 5 tend to increase when the distance between the coil and one of the facing surfaces of conducting material decreases. As a consequence the system in which disks 5 are incorporated including the suspended load oscillates about a stable equalibrium position. In other words, when the load to be suspended moves in the direction of arrow 9 of FIG. 1, space 7 becomes shallower and correspondingly space 6 becomes deeper. However, as a consequence of this upward movement, the repulsive force of coil 4a on disk 5 is increased with respect to the force exerted by coil 4b on the same disk whereby a stabilizing action is obtained on disk 5 and consequently on the suspended load. By means of shields 6 which prevent any dispersion of the magnetic field produced by coils 4 the efficiency of the same coils is increased, that is the force exerted by the coils on disks 5 is increased without any increase of the exciting power.

Magnet 2 can be made of any magnetic material; however the performances of the apparatus will be strongly influenced by the magnetic properties of this material.

Figure 3:
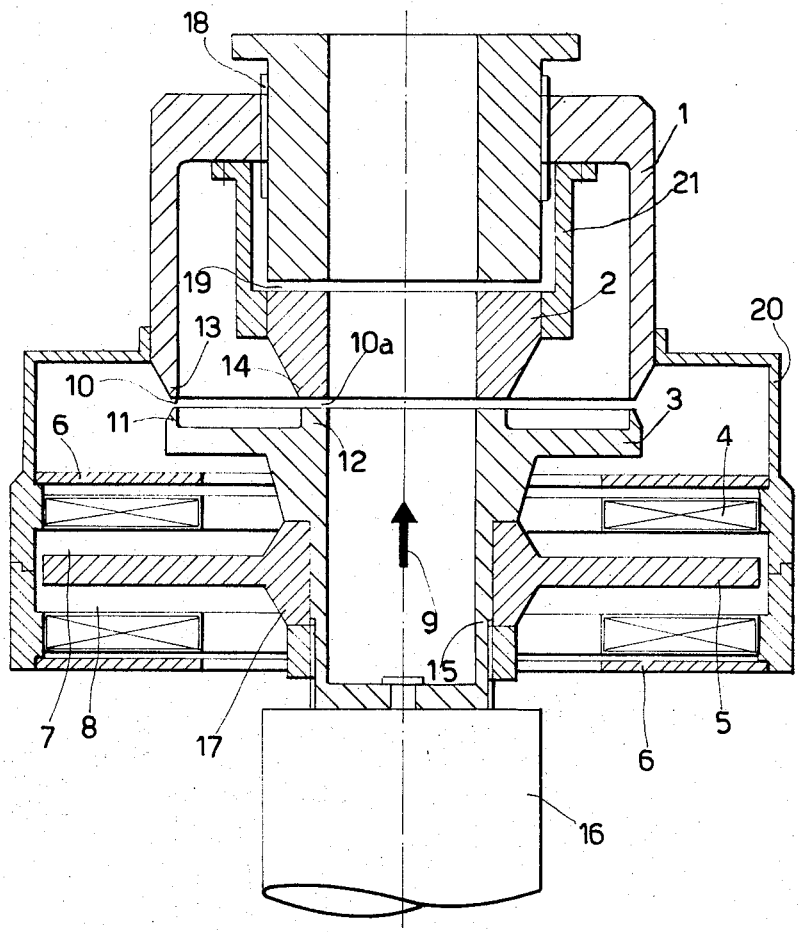
FIG. 3 shows an axial section of another variant of the device of this invention.

In those cases when the suspension force supplied by the magnet is to be adjusted without changing the depth of air gaps 10,10a an additional adjustable air gap can be provided as shown by FIG. 3.

As shown in this figure, the central portion 1a of support 1 of FIG. 1 is replaced by a ferromagnetic plug 18 which is threaded on its outer surface for engaging a corresponding threaded bore provided at the center of the upper portion of support 1. In this manner an additional air gap 19 is inserted in the magnetic circuit of magnet 2, which circuit therefore comprises now in addition to the magnet the following components:

plug 18;
support 1;
pole piece 13;
pole piece 11;
armature 3;
pole piece 12; and
pole piece 14 with air gaps 10 and 10a and adjustable air gap 19.

In this case, permanent magnet 2 is sustained by support 21 which is made of non magnetic material. Support 21 maintains unchanged the reciprocal position of magnet 2, support 1 and casing 20.

It is clearly understood that air gap 19 can be made to interrupt the magnetic circuit at locations other than that shown in FIG. 3, for instance along skirt 1b, and that more than one adjustable air gaps may be provided.

According to a second embodiment of this invention, not shown in the figures, the permanent magnet of the suspension device has the form of a ring coaxial with support 1, which ring occupies the lower portion of skirt 1b of the same support and has the same cross section of it. Said magnet ring, according to a first variant, is fastened to the rest of the skirt and according to second variant it is fastened to stationary support 20. Still according to this second variant, an air gap is provided between the top face of the ring magnet and the bottom face of the remaining skirt; in addition, the latter is connected to the central portion 1a of support 1 by means of a threading which is provided on any couple of adjoining cylindrical surfaces coaxial with said outer and inner support portions. In this way said air gap and consequently the force exerted by the magnet on armature 3 can be adjusted without modifying the air gap 10 between the body in which the magnet is incorporated and armature 3.

It is to be observed that in FIGS. 1, 2, 3 the central portions of magnet support 1, armature 3 and hub 15 are shown as provided with aligned central bores to indicate that the suspended body is made accessible through the suspension device with the purpose of introducing into the body when this is, for instance, a vessel sundry solid objects or liquids.

What is claimed is:

1. A device for suspending a load by means of magnetic forces at a predetermined level and for centering it with respect to a vertical axis and keeping it mechanically separated in operation from the surrounding structure by a space which may be filled with a fluid, which device comprises a stationary circular cylindrical body with vertical axis and horizontal bases in which body a toroidal recess is provided extending from the bottom base upward for a distance shorter than the body height whereby a cup-like shape is obtained of said body with a central cylindrical boss and outer cylindrical skirt, the lower ends of said boss and skirt being substantially at the same level, said skirt terminating with a downwardly pointing tapered edge; said cylindrical body being made of ferromagnetic material; a permanent magnet being incorporated therewith to provide a magnetic field of which the pole pieces are the circular tapered edge of said skirt and the bottom end of said boss; which device comprises a disk shaped armature fastened to said load and provided on its upper surface with a central projection aligned with said cylindrical boss and having substantially the same diameter and with a peripheral tapered ridge aligned with the tapered edge of said skirt; the upper surface of said central projection and peripheral ridge being separated in operation from the confronting surface of said cylindrical bell-shaped body by an air gap; which device comprises also at least one disk-shaped horizontal body of electricity conducting material coaxial with said armature and fastened thereto; each disk-shaped body being interposed between two annular horizontal coils mounted on a stationary support and excited by an external power source; the force for suspending the weight of load and of the structural components connected thereto being provided for a major portion by said permanent magnet while the difference between said weight and the magnet force is provided by said coils.

2. A device as claimed in claim 1, in which device said electric coils of annular form are stacked and coaxial one to the others and said electricity conducting metal bodies are circular and flat each of them being interposed between two of said coils; a separation space being left between the body and the adjacent coils whereby eddy currents are induced on said conducting bodies when said coils are energized with electric current; said armature being provided on its face confronting the permanent magnet with circular concentric projections which are aligned with the inner and outer circular pole pieces of the magnet and related support skirt; said device being further provided with two circular flat shields made of electricity conducting material which are placed above and below the coils stack with the purpose of preventing the magnetic flux generated by the coils from invading the space surrounding the assembly of the conducting bodies and of the coils.

3. A suspension device as claimed in claim 1, wherein said permanent magnet has the form of a right circular cylinder with vertical axis and strongly tapered at its lower portion, while its top base joins the bottom end of a ferromagnetic support which also has the form of a right circular cylinder and preferably the same cross section as the top base of the magnet, which support at its upper end extends horizontally for a distance and then vertically downwards to form a skirt which reaches the level of the bottom end of the magnet with a strongly tapered edge whereby an annular downwardly open space is defined between said cylindrical portion and said skirt portion of said support; in which device said armature is in the form of a disk from the upper surface of which a central circular boss and a tapered peripheral ridge project upwards to face respectively the bottom base of the magnet and the edge of said support skirt; said boss and ridge being separated in operation from the corresponding surfaces of said magnet and skirt by an air gap.

4. A device as claimed in claim 3 wherein said central cylindrical portion of said support is connected to the horizontally extending portion of the same support by a screw thread provided on the side surface of said cylindrical portion which screw thread engages a corresponding screw threading of a central bore provided through said horizontal portion a cuplike member being provided for firmly connecting the latter to said horizontal support portion, whereby the bottom end of the support cylindrical portion can be adjustably moved towards and away from the top magnet base and the strength of the magnetic flux can be adjusted without changing the relative positions of the magnet and armature.

5. A device for suspending a load and maintaining it centered with respect to a vertical axis, as claimed in claim 1, wherein said permanent magnet has the form of a ring coaxial with said body of ferromagnetic material which ring occupies the lower portion of the outer wall of said body and is fastened to the rest of the same wall; its cross section being trapezium-shaped with a horizontal side equal to the wall thickness and the opposed side very short and substantially equal to the width of the confronting top face of the armature peripheral ridge.

6. A device as claimed in claim 5 wherein said permanent magnet has the form of a ring coaxial with said body of ferromagnetic material which ring occupies the lower portion of the outer wall of said body and separated by an adjustable air gap therefrom said magnet being fastened to a stationary support while the rest of said outer wall can be moved up and down with respect to the stationary central portion of said ferromagnetic body by means of the screw threaded engagement between them.

7. A device as claimed in claim 1 wherein a cylindrical bore coaxial with said cylindrical body and in operation with said armature and said disk-shaped bodies is provided for giving access to the suspended load from the top of the suspension device.

* * * * *